April 17, 1973  K. I. SIMMONS, JR  3,728,181

APPLICATION OF TREAD STRIP TO TIRE CASING

Filed Sept. 28, 1970  3 Sheets-Sheet 1

INVENTOR
KENNETH I. SIMMONS, JR.

BY
Cushman, Darby & Cushman
ATTORNEYS

INVENTOR
KENNETH I. SIMMONS, JR.

BY Cushman, Darby & Cushman
ATTORNEYS

INVENTOR
KENNETH I. SIMMONS, JR

BY Cushman, Darby & Cushman
ATTORNEYS

United States Patent Office 3,728,181
Patented Apr. 17, 1973

3,728,181
APPLICATION OF TREAD STRIP TO TIRE CASING
Kenneth I. Simmons, Jr., Hartford City, Ind., assignor to Bandag Incorporated, Muscatine, Iowa
Filed Sept. 28, 1970, Ser. No. 76,195
Int. Cl. B29h 17/02, 17/06
U.S. Cl. 156—96                                             8 Claims

ABSTRACT OF THE DISCLOSURE

A precured rubber retread strip is applied to a prepared tire casing mounted for rotation about its axis by pressing the leading edge of a continuous tread strip against the tire periphery with a cold vulcanizing bonding medium disposed between the tire and the strip, driving either the tire or strip to cause rotation of the tire and wrapping of the strip around the tire, sensing the arrival of the leading edge of the strip at a predetermined point and cutting the strip in response to the arrival of the leading edge of the strip at a predetermined location so as to produce a strip of the appropriate length for the tire. The strip may be stretched longitudinally as it is applied to the tire or the tire circumference may be reduced by spreading the beads prior to application of the strip.

---

This invention relates to tire rebuilding or retreading and in particular to a method and apparatus for applying precured rubber tread strips to used tire casings prior to cold vulcanization of the tread to the tire.

It is known to retread tire casings with precured or prevulcanized rubber tread strips pre-cut to the proper length by first wrapping the tread strips around the periphery of the tire casings, with a suitable bonding medium interposed between the tread strip and the tire casing and then, as a separate operation, subjecting the assembly to heat and pressure to vulcanize the tread strip to the tire casing.

The present invention is concerned with the initial wrapping operation and provides a method and apparatus for withdrawing the tread strip from a supply thereof, such as a roll of tread strip, pressing the strip against a rotating tire and automatically cutting the moving strip in response to the arrival of the leading edge at a predetermined point such that the length of the cut strip will conform to the circumference of the tire. The invention also relates to a method and apparatus for feeding the tread strip and a strip of bonding medium from their respective sources and applying the strips substantially simultaneously to the periphery of a rotating tire.

As is known, a cold retreading operation employs a precured or prevulcanized tread strip which is bonded to the periphery of a prepared tire casing by means of a bonding medium which is vulcanized at relatively low temperature, usually below 350° F. and more often below about 200° F. and down to 140° F. or even lower. The bonding medium includes unvulcanized rubber, a vulcanizing agent such as sulfur and one or more vulcanizing agents which become active and promote the vulcanizing action at the specified low temperatures. Currently the preferred bonding medium is a thin flexible strip compounded of unvulcanized rubber and the vulcanizing agent and the accelerator, the last two components being in a sabilized form such that vulcanization does not occur until heat is applied. Another form of bonding medium is manufactured in two flexible strips of rubber, one strip containing the vulcanizing agent and the other containing the low-temperature accelerator. Yet another form is manufactured as a single rubber strip containing either the vulcanizing agent or the low-temperature accelerator and a gummy solution containing whichever component of the vulcanizing system is not present in the strip. In employing the two-strip or strip-plus-solution bonding mediums the components are kept apart until just before use and are then interposed between the tread strip and the tire casing at the beginning of the retreading operation. The present invention contemplates the use of any of these bonding mediums and it is intended that the latter term as used herein be so construed, although for simplicity in the description which follows only one strip of bonding medium is referred to. Also it will be understood that the hereinafter described processes may include the conventional step of applying rubber cement to the tire periphery prior to applying the tread strip.

The prevulcanized tread strip stock which is employed in cold retreading, and consequently in the present invention, should be distinguished from the unvulcanized tread strip stock employed in a hot retreading operation. The latter material is soft and can be permanently deformed by relatively low pressure or tension forces during handling and during application to a tire casing. As a consequence it is conventional to take special steps to avoid deforming or stretching the stock in order to avoid changes in the thickness and lateral dimensions of the stock. Precured tread stock, however, is tough and strong and will return to its original shape after deformation. Further, deformation occurs only under relatively more severe pressure or tension forces.

The invention will be further understood from the following detailed description of several embodiments, taken with the drawing in which.

Figure 1:
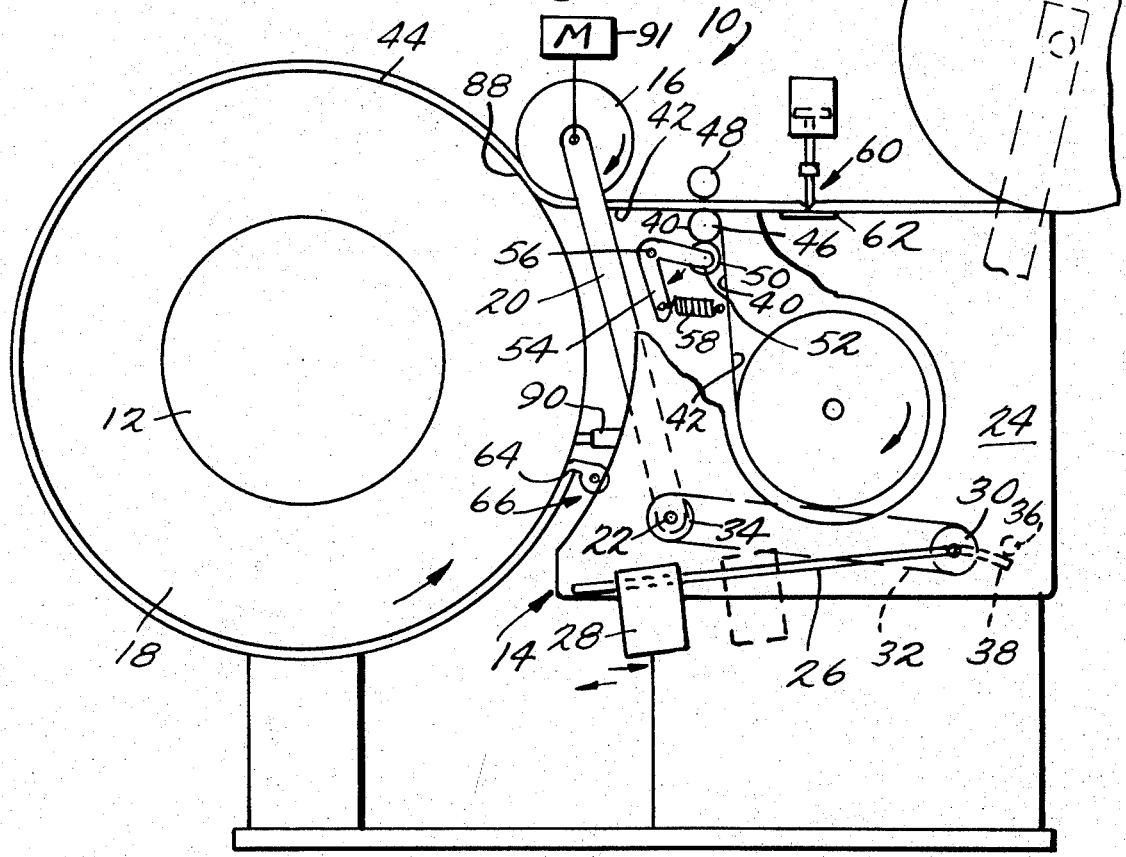
FIG. 1 is a schematic elevational view of a tire building machine, with some parts removed for simplicity embodying the principles of the present invention.

Referring to FIG. 1 there is shown a tire building machine 10 which includes a floor-mounted base 12 on which is mounted a rotatable tire-receiving rim structure 12 and an applicator assembly 14 which is mounted on the base 12 for horizontal movement toward and away from the rim structure 12. A drive system (not shown) is provided for adjusting the horizontal position of the application assembly 14.

The applicator assembly 14 includes a motor-driven applicator roll 16 which can be biased toward the rim structure so as to be capable of pressing against the periphery of a tire 18 mounted on the rim structure. In the illustrated embodiment the roll 16 is carried between the upper ends of two upstanding arms 20 which are secured at their lower ends to a horizontal shaft 22 which in turn is journalled at its ends in rigid side plates, one of which is shown at 24. The illustrated biasing device includes a lever arm 26 which carries a slidable weight 28, the arm 26 being fixed at one end to a sprocket 30 which is rotatably mounted on the side plate 24. Torque on the sprocket 30 is transferred to the shaft 22 by means of a chain 32 looped over the sprocket 30 and a second sprocket 34 fixed to the shaft 22. Counter-clockwise movement of the arms 20 under the force of gravity is limited by a fixed stop 36 which is engaged by an arm 38 carried by the sprocket 34.

Also carried by the applicator assembly 14 is a roller assembly for stripping the plastic cover sheet 40 from a strip of rubber bonding medium 42 and simultaneously lightly pressing the bonding medium 42 into engagement with the lower surface of the tread strip 44. The illustrated assembly includes a motor-driven roller 46 which with an upper, downwardly-biased roller 48 forms a nip which lightly presses the tread strip and bonding medium together. The plastic cover sheet 40, which is on the lower surface of the bonding medium as viewed in FIG. 1 is stripped from the bonding medium as it follows the periphery of the driven roller 46 into a nip formed by the engagement of the latter with a freely-rotatable take-up roller 50. The cover sheet is continuously wrapped around the take-up roller 50 during operation, and as the diameter of the resulting roll 52 of cover sheet increases, the take-up roller 50 moves away from the driven roller 46. The latter function may be accomplished by mounting the take-up roller 50 on an arm 54 pivoted at 56 and biased by a tension spring 58 toward the driven roller 46.

An automatic tread-cutting device is also carried on the applicator assembly 14 for cutting the proper length of tread strip 44 before the bonding medium 42 is attached. In the illustrated embodiment the cutting device includes a vertically movable pneumatically-operated knife 60 disposed above the tread strip and a fixed horizontal plate 62 disposed below the tread strip.

An important feature of the present invention is the automatic operation of the knife 60 or other cutting device at the proper time to produce a length of tread strip which conforms with the tire circumference. Broadly this is accomplished by sensing the arrival of the leading edge 64 of the tread strip at a predetermined location such that operation of the cutting device at that time will result in the proper length strip. Since tires of a rather wide range of circumferences will be retreaded it is not possible to employ both a fixed cutting station and a fixed sensing point for the leading edge of the tread strip, because such an arrangement would produce a uniform length of strip. Accordingly it is necessary to adjust one or more variables in the cutting operation to compensate for different tire circumferences.

Figure 2:
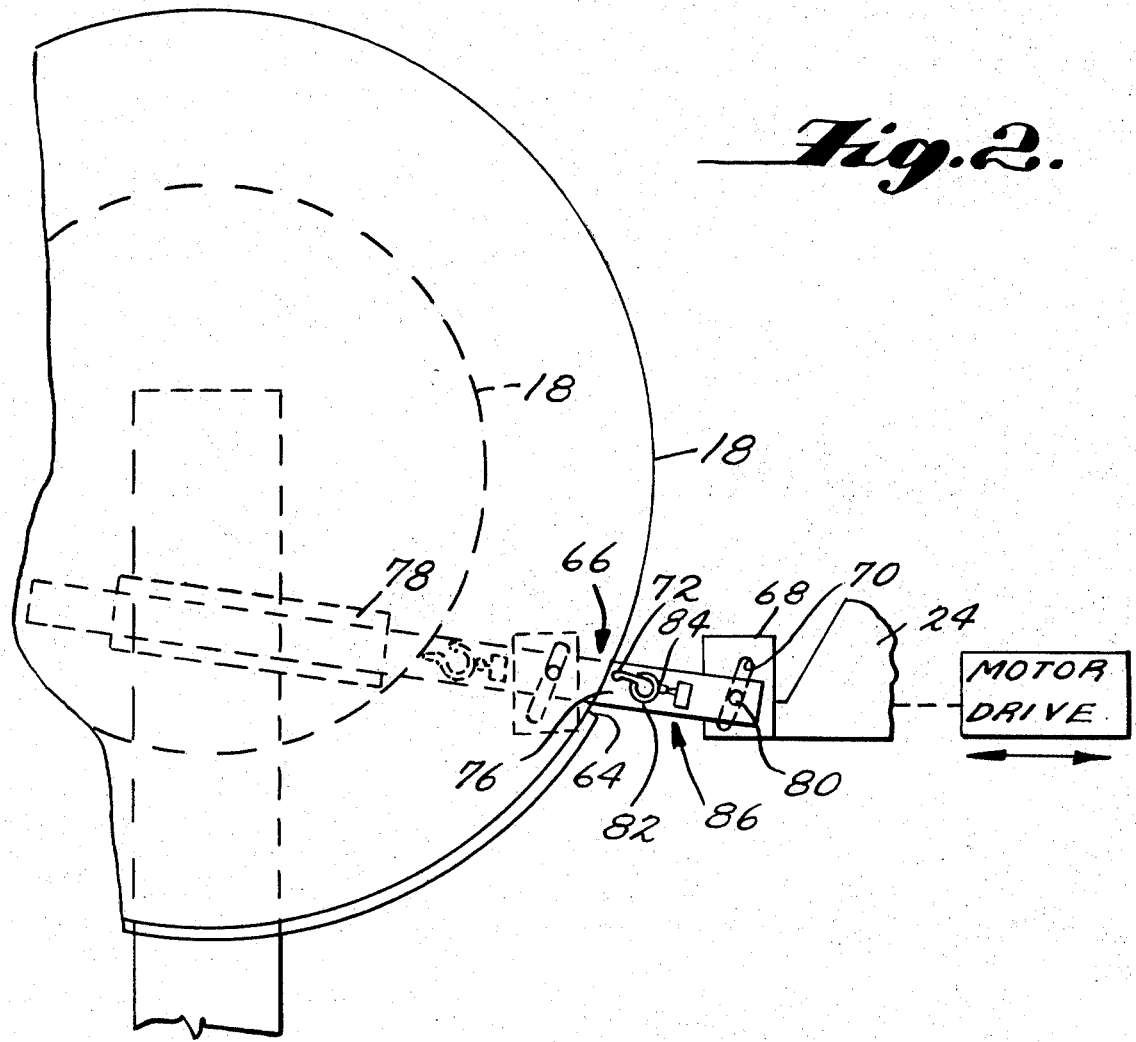
FIG. 2 is a schematic fragmentary view of part of FIG. 1.
Figure 3:
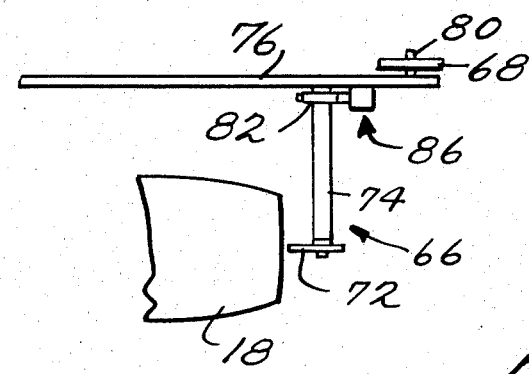
FIG. 3 is a plan view of the parts shown in FIG. 2.

The present invention in its preferred form provides for the automatic adjustment of the length of strip to be cut by adjusting the position at which the leading edge 64 is sensed in accordance with tire circumference and actuating the cutting device 60 upon actuation of the sensor. This is accomplished, in the illustrated embodiment and as shown in FIGS. 2 and 3, by mounting a sensor 66 for movement with the applicator assembly but along a special predetermined path. The special path is effected by means of a vertical cam plate 68 fixed to the side plate of the applicator assembly 14 and a linearly movable sensor support assembly which cooperates with an elongated inclined cam slot 70 in the plate 68. The sensor 66 includes a trigger 72 fixed to a horizontal shaft 74 which is rotatable about its own axis and carried on a support bar 76. The left end of the support bar 76 as viewed in FIG. 2 is slidably telescoped within a complementary inclined tube 78 which is fixed to the base 12 in any suitable manner. The right end of the support bar 76 carries a pin 80 which projects through the cam slot 70 with the result that horizontal movement of the applicator assembly 14 imparts movement of the trigger 72 along an inclined path toward the rim structure 12.

The remainder of the sensing arrangement includes a notched circular cam 82 fixed on the trigger shaft 74, the notch 84 receiving the movable element of a limit switch 86. When the leading edge 64 of the tread strip strikes the trigger 72, the latter together with the cam 82 are rotated and actuate the limit switch 86 which in turn stops the motor drive to the applicator roll.

It will be understood that movement of the trigger to the left along the inclined path has the effect of advancing counter-clockwise the position at which the leading edge of the tread strip will engage the trigger. It also has the effect of moving the trigger closer to the axis of the rim assembly. The clockwise inclination of the cam slot assures that the trigger will not engage the tire when the necessary advancing distance has been effected. It follows from the above that the smaller the diameter of the tire being retreaded the further to the left and the closer to the point of contact of tread strip and tire lies the trigger.

The precise inclination of the path along which the trigger is adjusted effects actuation of the trigger at a sensing point such that the fixed distance between the knife and the point of tread contact 88 with the tire is the same as the distance between the sensing point (point of contact between trigger and leading edge 64) and the point of tread contact measured along the circumference of the particular diameter tire being retreaded. In the illustrated embodiment of the inclination of the trigger path is about six and one-half degrees from the horizontal.

In operation, after an inflated tire has been mounted on the rim structure, the operator moves the applicator assembly to the left until the applicator roll 16 engages the tread strip which has been placed between the latter and the tire. This rocks the applicator roll assembly clockwise against the load applied by the weight and lever arm motor drive for the latter. Movement of the assembly 16 is stopped automatically by means of a limit switch 90. Usually about 30 to 60 pounds is applied to the tread strip. The purpose of the pressure is to stretch the tread strip as it is applied to the tire by the extruding action of the applicator roll 16. Usually about one inch of stretch is produced per tire circumference. In some cases it may be satisfactory not to stretch, but retread performance in terms of road life is improved, if stretch is effected.

The operator then actuates the motor drive 91 for the applicator roll 16. When the leading edge 64 of the tread strip rotates the trigger, the motor drive is stopped by actuation of the limit switch 86. The operator then manually operates the knife 60, applies cement to the end of the cut-off tread strip and jogs the motor drive by suitable controls to continue the wrapping operation. The splicing of the two ends of the strip is carried out conventionally.

It will be appreciated that the applicator roll 16 can be freely rotatable and the motor drive employed to drive the rim structure rather than vice versa as in the illustrated embodiment.

With respect to the mounting of the tire 18 preparatory to being retreaded it is generally preferred that the tire 18 be inflated to a pressure sufficient to render it substantially non-deformable by the pressure of the applicator roll 16. It is also generally preferred to carry out the retreading with the tire bead width at its normal dimension. Both of these features may be accomplished with a rim structure 12 constructed in the form of two adjustably spaced-apart coaxial bead plates. The plates are adjusted to the normal bead width and the uninflated tire is then mounted on the plates and then inflated until the beads spread to the extent permitted by the rims of the plates. In some cases, however, it may not be necessary either to inflate or to adjust the bead width.

Figure 4:
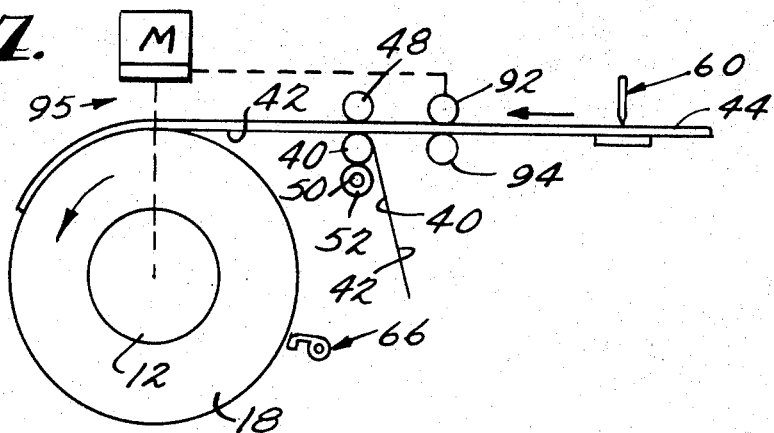
FIG. 4 is a fragmetary elevational view of a modified form of tire building machine.

An alternative manner for stretching the tread strip 44 as it is applied to the tire 18 is illustrated schematically in FIG. 4. In this embodiment the tread is stretched by driving the tire 18 after first attaching the leading edge of the tread 44 to the tire 18, as with cement, and then restraining the movement of the tread toward the tire 18. The restraining means may include a pair of nip rolls 92, 94 which are driven at a slightly lower peripheral speed than the tire 18 by a suitable motor drive 95. Alternatively the rolls 92, 94 may be braked. The tire 18 may be driven by driving the rim 12 or by surface contact with a driven roller. The cement, which is a solution of rubber in a solvent, will generally have sufficient strength to prevent the tread from separating from the tire, and an applicator roll is usually not necessary. It is, however, necessary to stitch the tread to the tire and this may be accomplished after the cutting of the tread by the knife 18 and the cutting of the bonding medium by suitable means.

As in FIG. 1 embodiment: Stitching may be accomplished by revolving the tire one or more revolutions while bringing a separate stitching roller into engagement with the tread with sufficient pressure to expel air from between the tread and the tire.

As an alternative to stretching the tread while applying it to the tire, the tire may first be reduced in diameter and then released after the tread has been applied. This reduction in diameter may be accomplished in the case of non-radial tires by increasing the bead width of the tire, as by means of a conventional internal spreading device. Preferably, however, a special technique is employed using the rim structure 98 illustrated schematically in FIG. 5. First the diameter of the tire 16 to be retreaded is measured after the buffing operation which is a conventional step in the retreading art. The diameter can be marked on the exterior of the side wall for future reference. The tire is then mounted on the rim structure 98 which includes two coaxial spaced apart bead plates 100, 102. The plate 100 is carried on one end of a piston rod 104 which extends through the other plate 102. The other end of the rod 104 carries a piston 106 which is slidable within a cylinder 108 containing hydraulic fluid.

When the tire is mounted on the plates 100, 102 and inflated through a valve 109, the tire beads exert a spreading force on the plates. Actual movement of the plate 100 is prevented, however, until hydraulic fluid is vented from the left side of the piston 106 to the right side, by opening a valve 110 in a by pass line 112. Allowing the bead width to increase permits the tire diameter to decrease, and by closing the valve 110 at the appropriate time the diameter of the tire can be reduced to less than the previously measured diameter. Approximately ⅜ inch reduction in diameter is usually sufficient. In order to determine when the valve 110 should be closed the changing diameter of the tire may be measured in any convenient manner, as with a mechanical indicating device 114.

Figure 5:
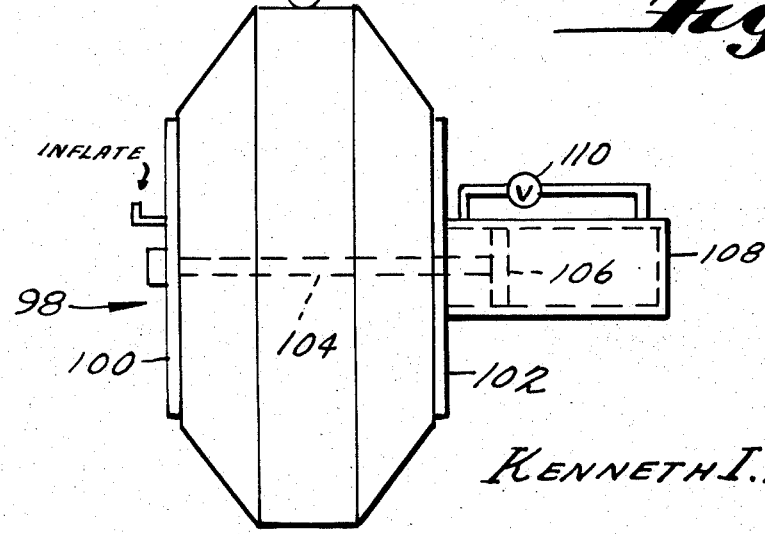
FIG. 5 is a schematic illustration of a special rim structure for use in carrying out certain features of the present invention.

The special rim structure 98 of FIG. 5 may be employed as the rim structure in the arrangement illustrated in FIG. 1, and in that event it will not be necessary to impart stretch to the tread by loading the applicator roll 16. When the beads are released after application of the tread, the tire returns to near its original diameter, and the tread is thereby stretched.

Figure 6:
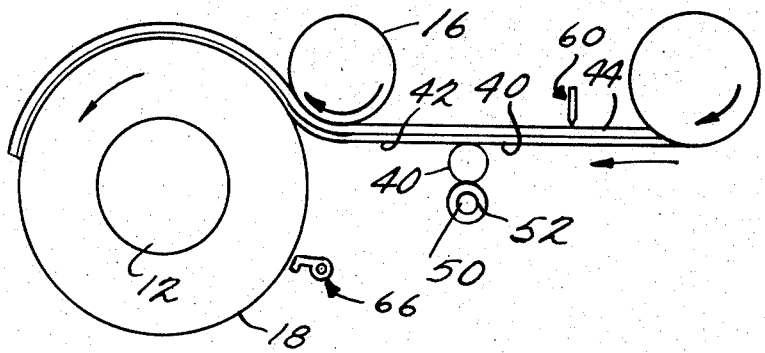
FIGS. 6 and 7 illustrate schematically two modified procedures by which the bonding medium may be applied.

FIG. 6 illustrates schematically the application of a tread strip 44 to the periphery of a tire 18 where the bonding medium 42 has previously been attached to the undersurface of the tread strip during a separate operation. The separate operation may have been a factory operation in which the continuous roll of tread strip and bonding medium is made up as part of the manufacturing operation. Alternatively the tread strip and bonding medium may have been joined together by the tire retreading shop as part of its operation. The process illustrated in FIG. 6 may include any of the alternative procedures described above with respect to stretching and dimensional control of the tire diameter.

Figure 7:
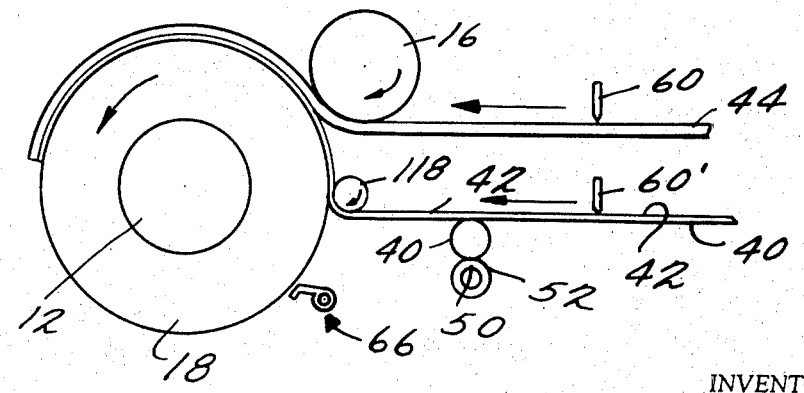

FIG. 7 illustrates schematically the application of the bonding medium 42 to the tire periphery prior to the application of the tread 44. A separate applicator roll 118 may be used for this purpose, and the bonding medium may be applied while the tread is being applied, as shown, or as a separate step. In the latter case the medium is applied to the entire tire circumference before application of the tread is begun.

What is claimed is:

1. In the method of applying a precured tread strip to the periphery of a tire casing mounted for rotation about its axis the steps of feeding the precured tread strip longitudinally of itself from a source thereof toward the tire casing; rotating the latter about its axis and engaging the moving tread strip with the periphery of the rotating tire casing at a fixed point with respect to said axis with a bonding medium interposed between the tire casing whereupon the tread strip is wrapped around the tire casing and the leading edge of the tread strip progresses around said axis; moving an assembly which includes an edge sensor and a tread cutter along a fixed path to a predetermined position which is dependent on tire diameter and which places said edge sensor in a position to be engaged by the leading edge of the tread strip; adjusting the distance between said edge sensor and said tread cutter in proportion to the extent of movement of said assembly along said path such that when the leading edge of the tread strip arrives at said edge sensor the length of the tread strip between said tread cutter and said leading edge is equal to the distance between said leading edge and the point of contact of the tread strip with the tire casing; and cutting the tread strip with the tread cutter when the leading edge of the tread strip arrives at said edge sensor.

2. A method as in claim 1 including the step of stretching the tread strip longitudinally of itself as it is pressed into contact with the periphery of the tire casing.

3. A method as in claim 2 wherein the tread strip is stretched by rolling it against the tire casing with sufficient pressure to deform the strip.

4. A method as in claim 2 wherein the tread strip is stretched by applying longitudinal tension thereto by feeding the strip between nip rollers to the tire casing at a lesser speed than the peripheral speed of the tire casing.

5. A method as in claim 1 including a step of applying a force to the tire casing to reversibly reduce the diameter of the tire casing before the tread strip is applied thereto and subsequently removing the force.

6. A method as in claim 5 wherein the diameter of the tire casing is reduced by mechanically spreading the tire beads.

7. A method as in claim 5 wherein the diameter of the tire casing is reduced by inflating the tire and allowing the tire beads to separate.

8. A method as in claim 1 wherein the tread strip is pressed into contact with the tire casing under conditions which impart no appreciable stretch to the tire casing.

References Cited

UNITED STATES PATENTS

| 2,976,910 | 3/1961 | Nowak | 156—96 |
| 2,110,293 | 3/1938 | Fisher | 156—96 |
| 2,282,580 | 5/1942 | Hawkinson | 156—96 |
| 1,255,073 | 1/1918 | Abbott | 156—405 X |
| 2,761,488 | 9/1956 | Kreighbaum | 156—405 |
| 1,246,488 | 11/1917 | Swartz | 156—405 |

FOREIGN PATENTS

| 222,115 | 3/1958 | Australia | 156—96 |
| 663,312 | 12/1951 | Great Britain | 156—405 |

ROBERT F. BURNETT, Primary Examiner

C. B. COSBY, Assistant Examiner

U.S. Cl. X.R.

156—130, 187, 250, 270, 405